(12) United States Patent
Ummethala et al.

(10) Patent No.: US 12,111,396 B2
(45) Date of Patent: Oct. 8, 2024

(54) DEVICE AND METHOD FOR SCANNING FREQUENCY-MODULATED CONTINUOUS WAVE (FMCW) LiDAR RANGE MEASUREMENT

(71) Applicant: Scantinel Photonics GmbH, Ulm (DE)

(72) Inventors: Sandeep Ummethala, Karlsruhe (DE); Naser Hosseini, Jette (BE); Vladimir Davydenko, Bad Herrenalb (DE)

(73) Assignee: Scantinel Photonics GmbH, Ulm (DE)

( * ) Notice: Subject to any disclaimer, the term of this patent is extended or adjusted under 35 U.S.C. 154(b) by 277 days.

(21) Appl. No.: 17/678,908

(22) Filed: Feb. 23, 2022

(65) Prior Publication Data

US 2023/0266466 A1    Aug. 24, 2023

(51) Int. Cl.
| | | |
|---|---|---|
| *G01B 9/02* | (2022.01) | |
| *G01S 7/481* | (2006.01) | |
| *G01S 7/4911* | (2020.01) | |
| *G01S 17/34* | (2020.01) | |
| *G01S 17/89* | (2020.01) | |

(Continued)

(52) U.S. Cl.
CPC ............ *G01S 17/34* (2020.01); *G01S 7/4814* (2013.01); *G01S 7/4817* (2013.01); *G01S 7/4911* (2013.01); *G01S 17/89* (2013.01); *G01S 17/931* (2020.01); *G01S 7/487* (2013.01)

(58) Field of Classification Search
CPC ......... G01S 17/34; G01S 7/4817; G01S 7/487
See application file for complete search history.

(56) References Cited

U.S. PATENT DOCUMENTS

| | | |
|---|---|---|
| 7,375,804 B2 | 5/2008 | Liebman et al. |
| 10,983,200 B1 | 4/2021 | Shen |
| 11,009,593 B1 * | 5/2021 | Davydenko ............. G01S 17/89 |

(Continued)

FOREIGN PATENT DOCUMENTS

WO    WO2021/239408 A1    12/2021

OTHER PUBLICATIONS

Scantinel Photonics GMBH, International Search Report and Written Opinion, PCT/EP2023/052147, Mar. 16, 2023, 13 pgs.

(Continued)

*Primary Examiner* — Mark Hellner
(74) *Attorney, Agent, or Firm* — Morgan, Lewis & Bockius LLP

(57) ABSTRACT

A device for scanning Frequency-Modulated Continuous Wave LiDAR range measurement comprises a light source that produces light having a varying frequency, a splitter that splits the light into reference light and output light, and a distribution matrix (36) that distributes the output light among a plurality of free space couplers that outcouple the output light into free space. A plurality of optical waveguides guide input light that was reflected at an object. A detector detects a superposition of the input light with the reference light, and a calculation unit determines the range to the object from the superposition detected by the detector. The device further comprises a common optical waveguide that is optically connected to the plurality of optical waveguides and the detector so that input light that is guided in any of the optical waveguides propagates through the common optical waveguide towards the detector without passing the distribution matrix.

8 Claims, 3 Drawing Sheets

(51) Int. Cl.
  *G01S 17/931* (2020.01)
  *G01S 7/487* (2006.01)

(56) References Cited

U.S. PATENT DOCUMENTS

| | | |
|---|---|---|
| 2006/0197936 A1 | 9/2006 | Liebman et al. |
| 2013/0166113 A1* | 6/2013 | Dakin .................. G01P 13/025 |
| | | 356/28 |
| 2021/0364607 A1 | 11/2021 | Davydenko |
| 2022/0011409 A1 | 1/2022 | Hosseini |
| 2022/0075035 A1* | 3/2022 | Liu ........................ G01S 17/32 |

OTHER PUBLICATIONS

Kiyat, Isa, Atilla Aydinli, and Nadir Dagli. "A compact silicon-on-insulator polarization splitter." IEEE photonics technology letters 17.1 (2004): 100-102, 3 pgs.

* cited by examiner

DEVICE AND METHOD FOR SCANNING FREQUENCY-MODULATED CONTINUOUS WAVE (FMCW) LiDAR RANGE MEASUREMENT

BACKGROUND OF THE INVENTION

1. Field of the Invention

The invention relates to a device and a method for scanning range—and preferably also velocity—measurement relative to a moving or unmoving object on the basis of FMCW LiDAR technology. Such devices and methods can be used, for example, in autonomously driving vehicles and may be implemented—at least to some extent—as photonic integrated circuits (PIC) that do not contain any moving parts.

2. Description of the Prior Art

Frequency-modulated continuous wave (FMCW) is a range and velocity measuring technology which was originally developed for RADAR applications. If light instead of radio waves are used, this technology is usually referred to as FMCW LiDAR, in which LiDAR is an acronym for "Light Detection And Ranging".

In FMCW LiDAR scanning devices, frequency-modulated light beams scan the environment. A small fraction of the light, which is diffusely reflected at an object, is received and superimposed with a local oscillator wave. The frequency difference between the two signals, which is usually referred to as beat frequency, is measured and used to compute the range of the object. By using a tunable laser as light source and a photodiode as detector, the beat frequency can be extracted directly from the photodiode current, because the photodiode delivers a current that is proportional to the squared sum of the two optical waves ("self-mixing effect"). If the Doppler shift is taken into account, the relative velocity between the scanning device and the object along the light propagation direction can be calculated, too.

Scanning devices based on this measurement principle have to be very robust and reliable if they are to be used in vehicles. This is true in particular if the vehicles drive autonomously, since the safety in autonomous driving decisively depends on the scanning device that is used to generate a three-dimensional profile of the environment. Scanning devices which are implemented as photonic integrated circuits (PIC) do not require moving components and are therefore particularly suitable for applications in vehicles.

Such PIC scanning devices are disclosed, for example, in WO 2021/239408 A1. These devices include a distribution matrix comprising a plurality of optical switches that are arranged in a tree-like manner. The distribution matrix distributes the optical signals among different free space couplers that emit the optical signal into free space. The free space couplers are arranged in a front focal plane of a collimating optical system that directs the optical signals optical waveguides into various directions.

FMCW LiDAR scanning devices for applications in vehicles require a high spatial resolution so that also small objects can be detected even at large distances. In the prior art devices mentioned above the available spatial resolution corresponds to the number of free space couplers or optical channels, which is equivalent to the number of pixels on a screen after post-processing. It can be shown that in the horizontal direction the number of optical channels should be at least in the order of 1.000, while in the vertical direction a smaller resolution often suffices.

In the prior art approaches, each optical channel has its own detector that is preferably formed by a photodiode in balanced configuration, because this greatly increases the detection sensitivity. Such a balanced photodiode (BPD) architecture requires at least 3 contact pads. Therefore, N optical channels require N balanced photodiodes and at least 3N pads for electrical connection of the photodiodes, not to mention the electrical connections required for a complex auto-balancing circuitry of a BPD. Due to the small size of the PIC, integration of many thousands of electrical connections together with the necessary optical waveguides and other components turns out to be difficult.

U.S. Pat. No. 7,375,804 B2 discloses a multi-beam LiDAR system which is not based on the FMCW, but on the time of flight (ToF) principle. For detecting the reflected laser signals, avalanche photodiodes ("APDs") are used because of their fast response and high gain. However, APDs are expensive and their support electronics can be complex. It is therefore proposed to delay the received optical signals differently in the optical channels and to combine the delayed optical signals into a multiplexed signal that is detected by only one APD.

SUMMARY OF THE INVENTION

It is an object of the present invention to provide a device and a method for scanning range measurement that allow simplified PIC layouts by reducing the number of electrical connections.

As far as the device is concerned, this object is achieved, in accordance with the invention, by a device for scanning FMCW LiDAR range measurement comprising a light source configured to produce light having a varying frequency, a splitter configured to split the light into reference light and output light, a distribution matrix configured to distribute the output light among a plurality of free space couplers that are configured to outcouple the output light into free space, and a plurality of optical waveguides that are configured to guide input light that was reflected at an object. The device further comprises a detector configured to detect a superposition of the input light with the reference light, and a calculation unit configured to determine the range to the object from the superposition detected by the detector. A common optical waveguide is optically connected to the plurality of optical waveguides and the detector so that input light that is guided in any of the optical waveguides propagates through the common optical waveguide towards the detector without passing the distribution matrix.

The inventor has perceived that only one detector, for example a single photodiode or a BPD, can be used for multiple receiving channels of a FMCW LiDAR system, because only one optical channel is active at any point in time. This approach greatly reduces not only the complexity of the optical circuitry, but also the required number of electrical contacts for a signal read-out. This approach may be realized using any integrated PIC platform, e.g. silicon, silicon nitride or indium phosphide.

The distribution matrix may comprise a plurality of optical switches that can be electrically controlled, or a combination of passive splitters and amplifiers that can be individually controlled. Semiconductor optical amplifiers (SOA) may be used to this end, with each SOA amplifying or attenuating the output light as a function of an externally applied voltage.

In an embodiment, each optical waveguide includes a splitter that separates the respective optical waveguide into a first portion and a second portion, wherein the first portion is configured to guide also the output light, and wherein the second portion is configured to guide only the input light. In other words, each first portion of one of the optical waveguides terminates in a free space coupler and is used both for transmitting and receiving optical signals. The free space couplers are then transceivers, i.e. they both transmit and receive optical signals. This concept, which is known in the art as such, reduces the number of optical waveguides and free space couplers by a factor of two.

However, if conventional light splitters are used for this purpose, this will inevitably result in large light losses. One may therefore use polarization diversity to efficiently separate the received input light from the transmitted output light. In a preferred embodiment, a splitter having a polarization sensitive splitting ratio is used to separate the input light from the output light. Then output light being in a first state of polarization SOP1 may be fully guided towards the respective free space coupler, while received light being in an orthogonal state of polarization SOP2 will be fully separated and guided into a split-off waveguide.

If polarization diversity is used, it has to be ensured that the states of polarization of the output light and the input light are different. A particularly simple approach would be to use a quarter-wave plate through which both the output light and the input light pass. A quarterwave plate converts output light being in a linear SOP1 into circularly polarized light. This circular state of polarization is maintained at the reflection at the object so that the received input light, when passing the quarter-wave plate on its way back to the device, will be converted into a linear state of polarization SOP2 that is orthogonal to the SOP1. SOP1 and SOP2 may be TE and TM polarizations, for example, or vice versa. However, completely different polarization schemes may be contemplated as well. Preferably the quarter-wave plate is arranged in free space.

The input light guided in each of the plurality of optical waveguides may be coupled into the common optical waveguide using a passive or an active coupling unit.

A passive coupling unit may comprise a polarization dependent direction coupler and a polarization rotator. Passive coupling is advantageous because it does not require any electric connections.

An active passive coupling unit may comprise a polarization rotator and an optical switch that is configured to be electrically controlled. Such a switch requires only—in addition to the ground terminal—one electrical contact and has some advantages because the received input light from the multiple optical channels can be guided individually controlled via the common optical waveguide towards the detector.

Preferably at least the distribution matrix, the plurality of optical waveguides and the common optical waveguide are formed on a common photonic substrate. However, it may also be envisaged to place also the light source, the splitter and the detector on the common photonic substrate.

As far as the method is concerned, the above stated object is achieved by a method of performing a scanning FMCW LiDAR range measurement, comprising the following steps:

a) producing light having a varying frequency;
b) splitting the light into reference light and output light;
c) distributing, in a distribution matrix, the output light among a plurality of free space couplers that outcouple the output light into free space;
d) guiding input light that was reflected at an object (12) through a plurality of optical waveguides;
e) propagating the input light guided in any of the optical waveguides through the common optical waveguide towards a detector without passing the distribution matrix;
f) detecting a superposition of the input light propagating in the common optical waveguide with the reference light in the detector; and
g) determining the range to the object from the superposition detected in step f).

A first portion of each optical waveguide may guide the output light towards one of the free space couplers, and wherein a second portion of the respective optical waveguides may guide only the input light.

The input light guided in each of the plurality of optical waveguides may be coupled into the common optical waveguide using a passive or an active coupling unit that changes the state of polarization.

Both the output light and the input light may pass a quarter-wave plate that is preferably arranged in free space.

BRIEF DESCRIPTION OF THE DRAWINGS

Various features and advantages of the present invention may be more readily understood with reference to the following detailed description taken in conjunction with the accompanying drawings in which:

FIG. 3b schematically shows a scanning unit contained in the device of FIG. 3a;

DETAILED DESCRIPTION OF EMBODIMENTS

1. Application Scenario

Figure 1:
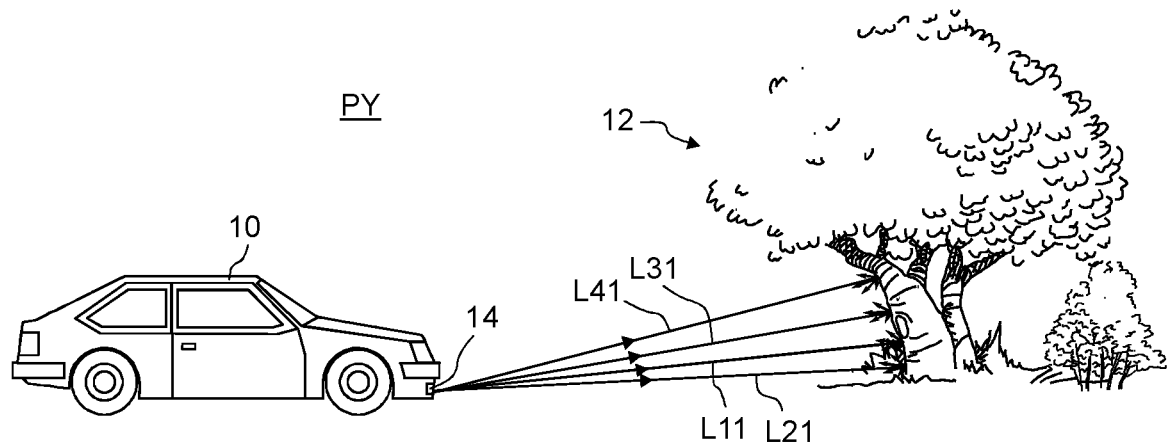
FIG. 1 is a schematic side view of a vehicle approaching an object which is detected by a scanning device according to the invention.

FIG. 1 is a schematic side view of a vehicle 10 approaching an object 12 that is represented by a tree. The vehicle 10 has at least one scanning device 14 that uses light beams L11, L21, L31 and L41 to scan the environment ahead of the vehicle 10. From the distance information generated by the scanning device 14 a three-dimensional image of the environment can be calculated. In addition, the scanning device 14 determines the relative speed to the object 12. This information is particularly important if the object 12 is another vehicle, an animal or a pedestrian that is also moving.

Figure 2:
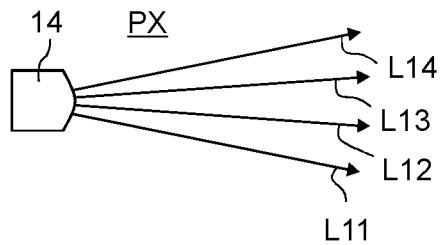
FIG. 2 is a top view of the scanning device shown in FIG. 1.

As can be seen in FIG. 1, the scanning device 14 emits light beams L11 to L41 in different directions in a vertical plane (in FIG. 1 this is the paper plane) in order to scan the environment in a vertical direction. Scanning takes place also in a horizontal direction, as this is shown in FIG. 2 which is a top view on the scanning device 14. Four light beams L11, L12, L13 and L14 are shown which are emitted in different directions in a horizontal plane.

For reasons of clarity, it is assumed in FIGS. 1 and 2 that only four light beams Ln1 to Ln4 in four different planes— i.e. a total of 16 light beams—are generated by the scanning device 14. However, in reality the scanning device 14 emits significantly more light beams. For example, $k \cdot 2^n$ light beams are preferred, where n is a natural number between 7 and 13 and indicates how many beams are emitted in one of k planes, where k is a natural number between 1 and 16. In some embodiments, more than one light beam is emitted at a given time in order to achieve the desired spatial and temporal resolution.

2. Scanning Device

Figure 3A:
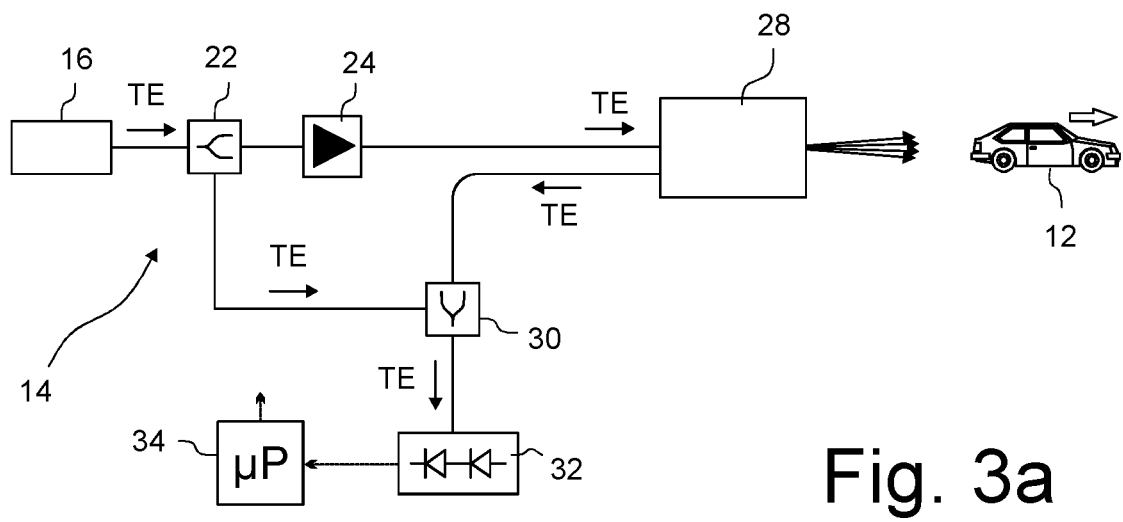
FIG. 3a schematically shows the design of the scanning device according to an embodiment.

FIG. 3a schematically shows the basic design of the scanning device 14 according to an embodiment of the invention. The scanning device 14 is designed as a LiDAR system and comprises an FMCW light source 16 which generates measuring light in a TE state of polarization (SOP).

Figure 4:
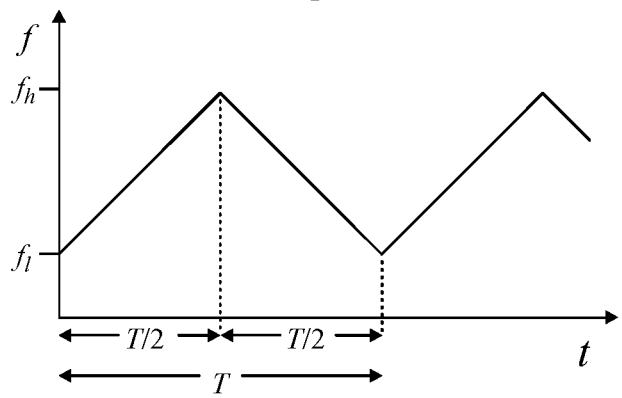
FIG. 4 is a graph illustrating the time dependency of the frequency of the light emitted by a light source that is contained in the scanning device.

As illustrated in FIG. 4, the measuring light has a frequency f that varies ("chirps") periodically over time t between a lower frequency $f_l$ and a higher frequency $f_h$. Each measurement interval with a chirp duration T is divided into two halves of equal length T/2. During the first interval the frequency f increases linearly with a constant and positive upchirp rate $r_{chirp}=df/dt$. During the second interval, the frequency f decreases linearly with a constant negative downchirp rate $-r_{chirp}$. The frequency of the measured light can thus be described by a periodic triangular function. However, other functional relationships are also contemplated, e.g. sawtooth functions.

Referring again to FIG. 3a, the light source 16 is connected to a splitter 22 that splits the measuring light into reference light (also referred to as local oscillator) and output light. In the illustrated embodiment, the output light is amplified by an optical amplifier 24. The amplified output light then enters a scanning unit 28 that is shown separately in FIG. 3b. The scanning unit 28 has a distribution matrix 36 comprising a plurality of optical switches 38 that are arranged in a tree-like manner and can be individually controlled. The distribution matrix 36 distributes the output light among a plurality of first output waveguides 40 each including a polarization sensitive splitter 42 and terminating in a free space coupler 44 that outcouples the output light into free space. The free space coupler 44 may be formed by an edge or a grating coupler, for example, as this in known in the art as such.

Figure 3B:
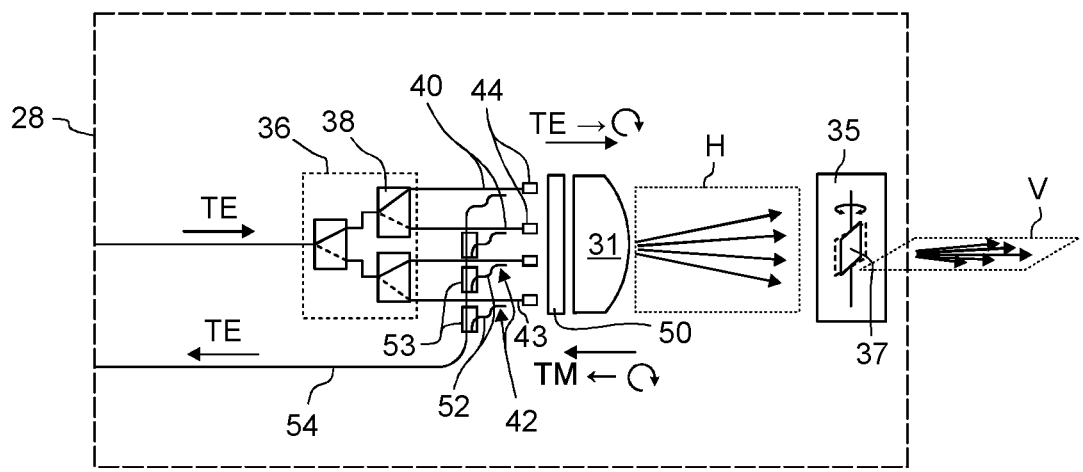
Figure 5:
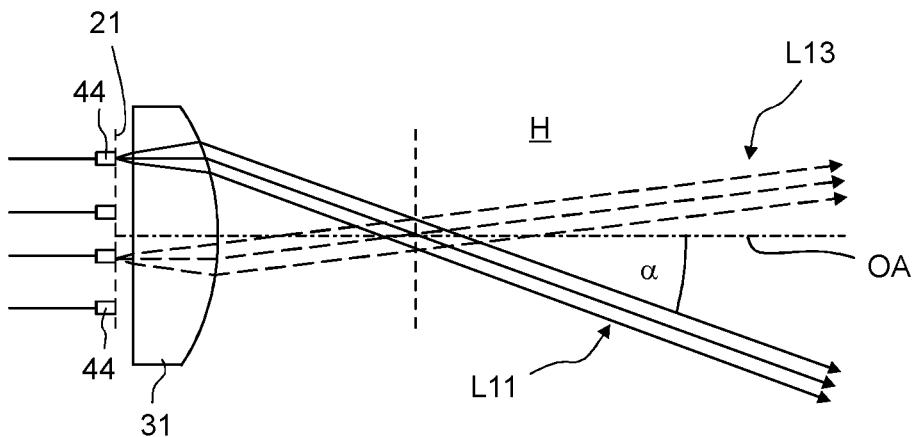
FIG. 5 is an enlarged cutout from FIG. 3b showing the beam steering accomplished by the arrangement of the free space couplers in the front focal plane of collimating optics.

As can be seen in the enlarged cutout of FIG. 5, the edge couplers 44 form a linear array that is arranged in a front focal plane 21 of collimating optics 31 represented in FIGS. 3b and 5 by a single lens. The direction of output light emitted from the collimating optics 31 in a horizontal plane H (i.e. the plane of the paper in FIGS. 3b and 5) depends on the distance of the respective edge coupler 44 the optical axis OA of the collimating optics 31. Thus it is possible to select the beam direction by controlling the optical switches 38 in the distribution matrix 36 in such a way that the output light leaves the desired free space coupler 44.

In certain PIC designs, the output light leaves the PIC perpendicular or at an angle <90° to the plane of the PIC substrate. The collimating optics 31 then has an optical axis OA that is also perpendicular or inclined to this plane.

Referring again to FIG. 3b, beam steering in vertical planes V is accomplished, in the embodiment shown, by a mechanical scanner 35 comprising a rotating or oscillating mirror 37. In other embodiments, a plurality of PICs each representing a different emission plane is stacked one above the other so that the free space couplers 44 do not form a line, but a two-dimensional array. In this case no mechanical scanner 35 for the second scan direction is required.

A quarter-wave plate 50 is arranged between the edge couplers 44 and the collimating optics 31. The quarter-wave plate 50 transforms the TE state of polarization (SOP) of the emitted output light into a circular SOP, as this is indicated in FIG. 3b by symbols.

The output light emitted by the scanning unit 28 is at least partially diffusely reflected at the object 12 which is represented in FIG. 3b by a moving car. A small portion of the reflected light returns to the scanning unit 28, where it passes the quarter-wave plate 50 again and is re-coupled into the edge couplers 44. The quarter-wave plate 50 transforms the circular SOP of the reflected light into a TM SOP, as this is indicated in FIG. 3b by symbols.

This small portion of the reflected light, which will be referred to in the following as input light, enters the free space coupler 44 from which it has been coupled out before, and is guided along the first optical waveguide 40 until it reaches the polarization sensitive splitter 42. Since the input light is in a TM SOP which is orthogonal to the TE SOP of the output light, the input light is split off from the first optical waveguide 40 and propagates along a second optical waveguide 52. The optical waveguide portion 43 between the polarization sensitive splitter 42 and the free space coupler 44 is thus part both of the first optical waveguide 40, in which the output light is guided, and of the second optical waveguide 52, in which the input light is guided.

Coupling units 53 couple the input light guided in any of the second optical waveguides 52 into a single common optical waveguide 54 without passing the distribution matrix 36. Possible configurations of the coupling units 3 will be explained in more detail below with reference to FIGS. 6 and 7. During the coupling process in the coupling units 53, the TM SOP is converted to a TE SOP.

As shown in FIG. 3a, the common optical waveguide 54 is connected to a combiner 30 where the input light is superimposed with the reference light that has been separated from the measurement light by the splitter 22. Since the frequencies of the superimposed light components are slightly different due to the different optical path lengths, a beat signal is generated which is detected by a balanced photodetector or another type of detector 32. The electrical signals generated by the detector 32 are fed to a calculation unit 34, which calculates the distance R and the relative radial velocity v to the object 12 on the basis of the detected beat frequencies.

With the exception of the quarter-wave plate 33, the collimating optics 31 and the mechanical scanner 35, all optical components shown in FIGS. 3a and 3b and described in the foregoing are arranged on a common photonic substrate, thereby forming a photonic integrated circuit (PIC). However, it may also be envisaged to form groups of components on different substrates, or to have only some of these components integrated in the PIC, while others are connected to the PIC via an optical fiber.

3. Coupling Units
a) Passive

Figure 6:
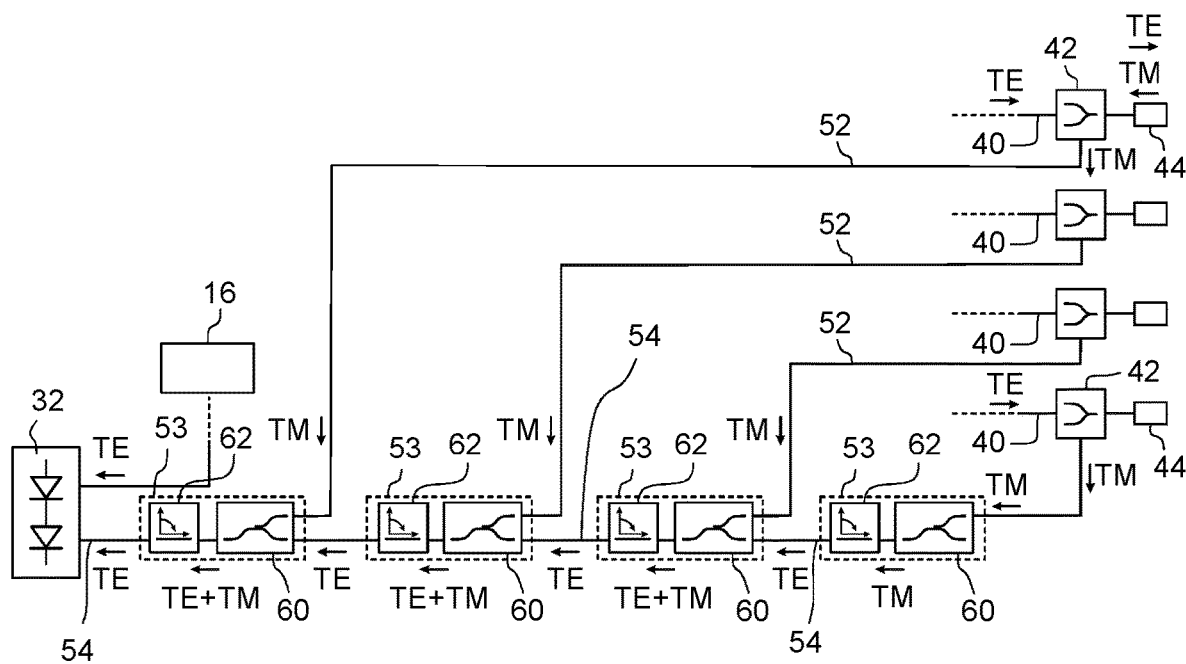
FIG. 6 schematically shows a portion of the scanning unit of FIG. 3b using passive coupling units for coupling input light on a common optical waveguide.

In the embodiment shown in FIG. 3a the input light guided in each of the plurality of second optical waveguides 52 and being in a TM SOP is coupled into the common optical waveguide 54 using a passive coupling unit 53. As can be seen in FIG. 6, which illustrates some of the components shown in FIG. 3b in more detail, each passive coupling unit 53 comprises a polarization dependent direction coupler 60 and a polarization rotator 62.

The direction coupler 60 is a 2×2 direction coupler with one dead end and being designed in such a manner that light being in a TM SOP is cross-coupled, while light being in a TE SOP passes in the bar-state. A possible configuration of this type of direction coupler is disclosed in I. Kiyat, A. Aydinli and N. Dagli, "A compact silicon-on-insulator polarization splitter," in *IEEE Photonics Technology Letters*, vol. 17, no. 1, pp. 100-102, January 2005, doi: 10.1109/LPT.2004.838133.

Thus the received input light guided in the second optical waveguides 52 is cross-coupled on the common optical waveguide 54, while the direction coupler 60 is transparent for light that is in a TE mode and is already guided in the common optical waveguide 54.

The polarization rotator 62 transmits the TE SOP undisturbed while rotating the TM SOP into a TE SOP. As a result, the input light in the TE SOP traverses, once it is coupled into the common optical waveguide 54, all subsequent passive coupling units 53 without any change of SOP or substantial attenuation before reaching the detector 32. Since this implementation of the coupling unit 53 is purely passive, no electrical connections are required.

Suitable designs for the polarization rotator 62 are described in U.S. Pat. No. 10,983,200 B1 and in applicant's U.S. patent application Ser. No. 17/511,361 filed 26 Oct. 2021.

b) Active

Figure 7:
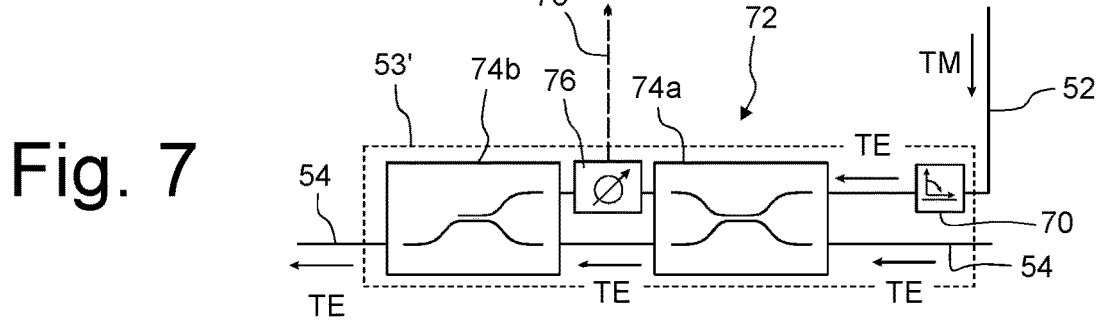
FIG. 7 schematically shows an active coupling unit that may alternatively be used in the scanning unit of FIG. 3b.

FIG. 7 shows an active coupling unit 53' that may be used in the scanning device 14 of FIGS. 3a and 3b instead of the passive coupling unit 53. Each active coupling unit 53' comprises a polarization rotator 70 and an optical switch 72 that is configured to be electrically controlled.

The received input light that is guided in one of the second optical waveguides 52 has its SOP changed in the polarization rotator 70 from the TM to TE. The input light, now in the TE SOP, passes the optical switch 72 that comprises a pair of 50:50 direction couplers 74a, 74b (or alternative 2×2 multi-mode interference (MMI) couplers) and a tuneable phase shifter 76 embedded between the pair of direction couplers 74a 74b. The phase-shifter 76 may be realized using the thermo-optic, electro-optic or stress-optic effect, for example.

The optical switches 72 are all passively set to full transmission in the bar-state so that they are transparent for input light that is already guided in the common optical waveguide 54. If input light from a specific second optical waveguide 52 needs to be coupled into the common optical waveguide 54, the optical switch 72, which is connected to the respective second optical waveguide 52, is set into the cross-state by applying an appropriate voltage to the phase shifter 76 via an electrical line 78. In this manner, the input light guided in the second optical waveguide 52 couples into the common optical waveguide 54.

Contrary to FIG. 1, the embodiment in FIG. 2 is an active implementation that needs active switches 74a, 74b to control the path of the input light received by the free space couplers 44 on its way to the detector 32. Since only one optical channel is active at a particular instant in time, only one phase shifter 76 needs to be controlled, provided that the switches 74, 74b are set to the desired bar-state through a proper design. The control of each phase shifter 76 needs two electrical contacts, namely a positive terminal and a ground terminal. Thus, controlling the input light from N optical channels would require N+1 electrical contacts, assuming that the ground lines of all phase shifters 76 are consolidated into a single electrical contact.

4. Other Embodiments

The embodiments disclosed herein can be realized using any integrated photonic platform, e.g. silicon, silicon nitride or indium phosphide.

Furthermore, it should be noted that the roles of TE and TM SOP can of course be exchanged. Still further, it is possible to convert the input light in the TM SOP that is guided in the second optical waveguides 52 into an intermediate SOP, for example a higher-order TE or TM mode, before converting it to the TE SOP. Generally, the SOP guided in the optical waveguides does not need to be linear, but may also be elliptical or circular, for example, as long as the two SPOs are orthogonal.

Figure 8:
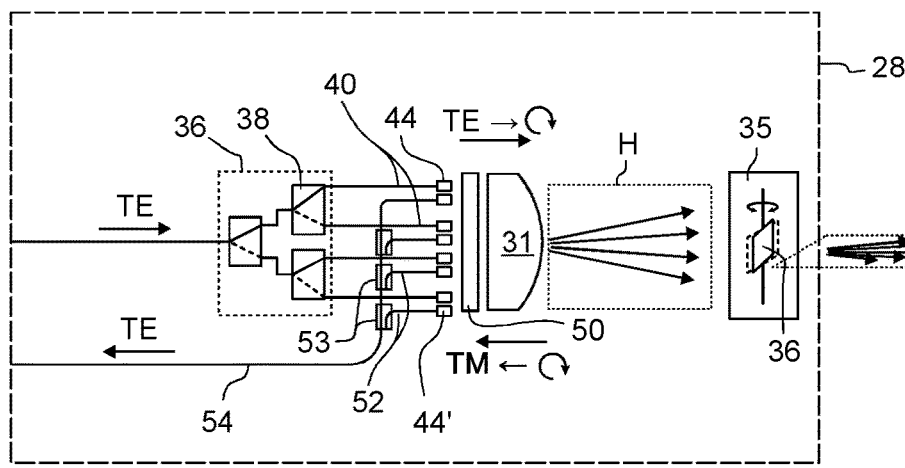
FIG. 8 schematically shows a scanning unit contained in the device of FIG. 3a according to an alternative embodiment.

FIG. 8 shows, in a representation similar to FIG. 3b, the scanning unit 28 according to an alternative embodiment. This embodiment differs from the embodiment shown in FIGS. 3a and 3b only in that there is no optical waveguide portion that is common both to the first optical waveguide 40 and the second optical waveguide 52. Instead, each second optical waveguide 52 terminates in its own free space coupler 44' that is only used to receive input light, but not to emit output light. No polarization sensitive splitters 42 are required in this embodiment, but the number of free space couplers is twice as large.

The invention claimed is:

1. A device for scanning Frequency-Modulated Continuous Wave (FMCW) LiDAR range measurement, comprising:
   a light source configured to produce light having a varying frequency,
   a splitter configured to split the light into reference light and output light,
   a distribution matrix configured to distribute the output light among a plurality of free space couplers that are configured to outcouple the output light into free space,
   a plurality of optical waveguides that are configured to guide input light that was reflected at an object,
   a detector configured to detect a superposition of the input light with the reference light, and
   a calculation unit configured to determine the range to the object from the superposition detected by the detector,
   wherein:
   the device further comprises a common optical waveguide that is optically connected to the plurality of optical waveguides and the detector so that input light that is guided in any of the optical waveguides propagates through the common optical waveguide towards the detector without passing the distribution matrix;
   each of the plurality of optical waveguides includes a splitter that separates the respective optical waveguide into a first portion and a second portion;

the first portion is configured to guide also the output light;

the second portion is configured to guide only the input light; and the input light guided in each of the plurality of optical waveguides is coupled into the common optical waveguide using a passive or an active coupling unit.

2. The device of claim 1, wherein the splitter has a polarization sensitive splitting ratio.

3. The device of claim 1, wherein the coupling unit is a passive coupling unit comprising a polarization dependent direction coupler and a polarization rotator.

4. The device of claim 1, wherein the coupling unit is an active passive coupling unit comprising a polarization rotator and an optical switch that is configured to be electrically controlled.

5. The device of claim 1, comprising a quarter-wave plate through which both the output light and the input light pass.

6. The device of claim 1, wherein at least the distribution matrix, the plurality of optical waveguides and the common optical waveguide are formed on a common photonic substrate.

7. A method of performing a scanning Frequency-Modulated Continuous Wave (FMCW) LiDAR range measurement, comprising the following steps:

a) producing light having a varying frequency;

b) splitting the light into reference light and output light;

c) distributing, in a distribution matrix, the output light among a plurality of free space couplers that outcouple the output light into free space;

d) guiding input light that was reflected at an object through a plurality of optical waveguides;

e) propagating the input light guided in any of the plurality of the optical waveguides through a common optical waveguide towards a detector without passing the distribution matrix;

f) detecting a superposition of the input light propagating in the common optical waveguide with the reference light in the detector; and g) determining the range to the object from the superposition detected in step f), wherein a first portion of each of the plurality of optical waveguides guides the output light towards one of the free space couplers, and a second portion of the respective optical waveguides guides only the input light and the input light guided in each of the plurality of optical waveguides is coupled into the common optical waveguide using a passive or an active coupling unit that changes the state of polarization.

8. The method of claim 7, wherein both the output light and the input light pass a quarter-wave plate.

* * * * *